United States Patent
Glaser et al.

(10) Patent No.: US 10,191,611 B2
(45) Date of Patent: Jan. 29, 2019

(54) GRAPHICAL USER INTERFACE DEFINED CURSOR DISPLACEMENT TOOL

(71) Applicant: GitSuite LLC, Berry Hill, TN (US)

(72) Inventors: Joseph Glaser, Berry Hill, TN (US); Jerry David Rawle, Hendersonville, TN (US)

(73) Assignee: GitSuite LLC, Berry Hill, TN (US)

( * ) Notice: Subject to any disclaimer, the term of this patent is extended or adjusted under 35 U.S.C. 154(b) by 0 days.

(21) Appl. No.: 15/361,830

(22) Filed: Nov. 28, 2016

(65) Prior Publication Data

US 2017/0153785 A1 Jun. 1, 2017

Related U.S. Application Data

(60) Provisional application No. 62/260,424, filed on Nov. 27, 2015.

(51) Int. Cl.
*G06F 3/0481* (2013.01)
*G06F 3/0488* (2013.01)
*G06F 3/0484* (2013.01)

(52) U.S. Cl.
CPC ...... *G06F 3/04812* (2013.01); *G06F 3/04845* (2013.01); *G06F 3/04883* (2013.01)

(58) Field of Classification Search
CPC .... G06F 3/04812; G06F 3/044; G06F 3/0481; G06F 3/0482; G06F 3/04842; G06F 3/04883; G06F 3/04845
See application file for complete search history.

(56) References Cited

U.S. PATENT DOCUMENTS

| | | | | |
|---|---|---|---|---|
| 8,316,319 | B1 * | 11/2012 | Patel | G06F 3/04883 710/38 |
| 9,292,161 | B2 * | 3/2016 | Carter | G06F 3/04883 |
| 2004/0240709 | A1 * | 12/2004 | Shoemaker | G06F 3/013 382/103 |
| 2006/0132460 | A1 * | 6/2006 | Kolmykov-Zotov | G06F 3/04812 345/173 |
| 2007/0064018 | A1 * | 3/2007 | Shoemaker | G06F 3/0481 345/660 |
| 2010/0280638 | A1 * | 11/2010 | Matsuda | G06F 3/165 700/94 |
| 2011/0004821 | A1 * | 1/2011 | Miyazawa | G06F 3/04883 715/702 |
| 2011/0289461 | A1 * | 11/2011 | Jancourtz | G06F 3/04812 715/856 |
| 2012/0210261 | A1 * | 8/2012 | Sarnoff | G06F 3/04845 715/765 |
| 2013/0002546 | A1 * | 1/2013 | Hashimoto | G06F 3/04812 345/157 |

(Continued)

*Primary Examiner* — Tom V Sheng
(74) *Attorney, Agent, or Firm* — MKG, LLC

(57) ABSTRACT

A graphical user interface ("GUI") defined cursor displacement tool is provided for use on a touch-sensitive display or screen of a computing system. The GUI defined cursor displacement tool includes a first portion defining a cursor control handle, a second portion defining a cursor tip, and an offset visibly separating the cursor control handle and the cursor tip. The control handle is operable to synchronously move about the touch-sensitive screen with the cursor tip, at the offset from the cursor tip, to interact with screen graphics displayed on the touch-sensitive screen.

11 Claims, 5 Drawing Sheets

(56) References Cited

U.S. PATENT DOCUMENTS

| | | | |
|---|---|---|---|
| 2014/0026097 A1* | 1/2014 | Crohas | G06F 3/04883 715/810 |
| 2014/0208270 A1* | 7/2014 | Lee | G06F 3/0488 715/835 |
| 2014/0253463 A1* | 9/2014 | Hicks | G06F 3/03545 345/173 |
| 2014/0282154 A1* | 9/2014 | Petit | G06F 3/0488 715/765 |
| 2014/0380239 A1* | 12/2014 | Kang | G06F 3/0482 715/810 |
| 2015/0309704 A1* | 10/2015 | Bae | G06F 1/1677 715/765 |
| 2015/0355722 A1* | 12/2015 | Hwang | G06F 1/163 715/863 |
| 2016/0070407 A1* | 3/2016 | Jeon | G06F 1/1626 345/173 |
| 2016/0266763 A1* | 9/2016 | Gupta | G06F 3/04845 |

* cited by examiner

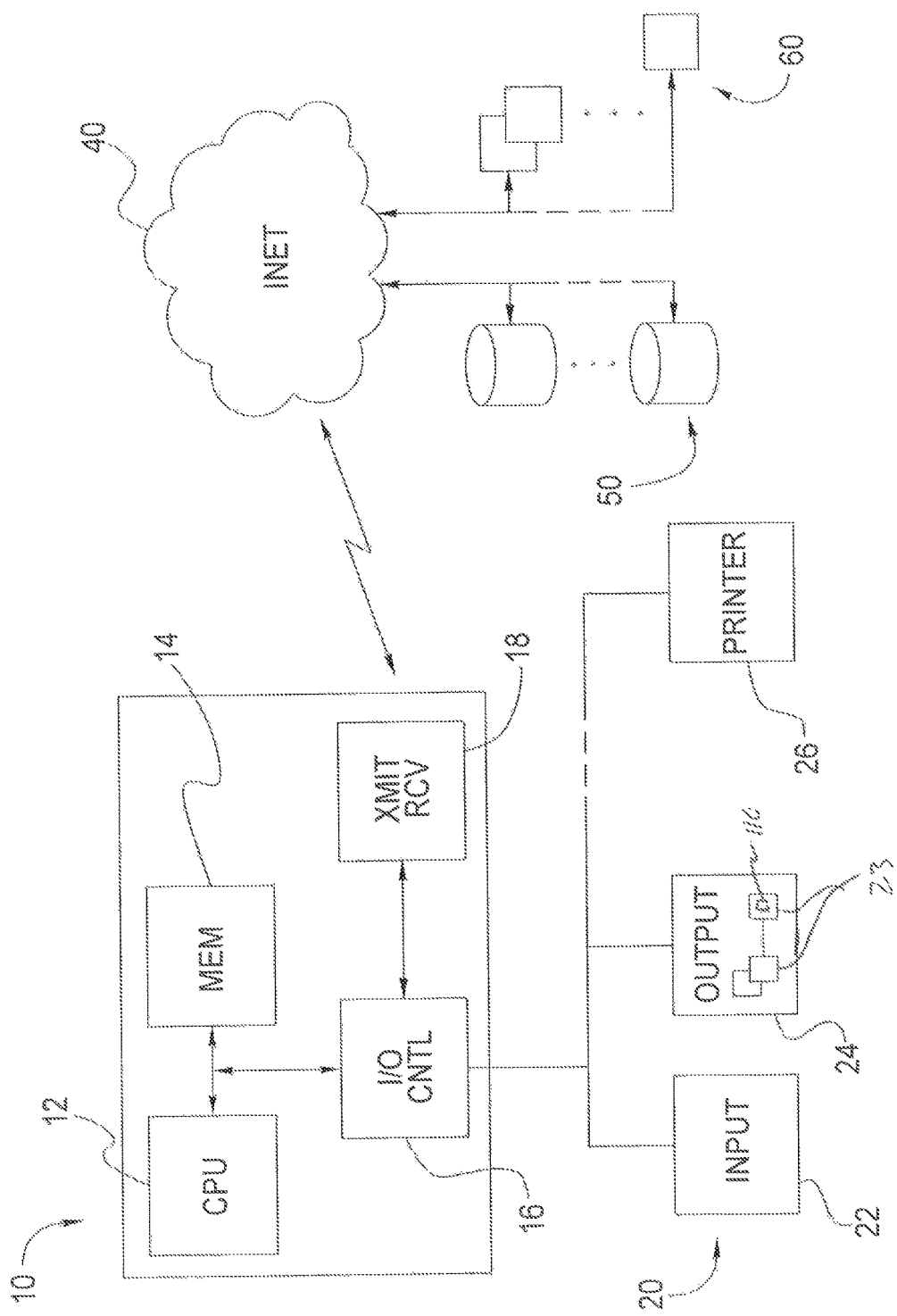

GRAPHICAL USER INTERFACE DEFINED CURSOR DISPLACEMENT TOOL

CROSS REFERENCE

This application claims the benefit of U.S. Provisional Patent Application No. 62/260,424 filed on Nov. 27, 2015, the contents of which are incorporated herein by reference in their entirety.

FIELD OF THE INVENTION

This invention relates to use of a graphical user interface or "GUI" having a cursor control feature operative with a conductive touch of a human finger on a specialized device for input, commonly referred to as a "capacitive touch-screen" and referred to herein as a "touch-screen." In particular, this invention relates to fingertip, stylus or control tool-sensitive cursor functions for touch-screen drawing, object selection and object location manipulation. More particularly, this invention relates to the situation in which the point, line, object or drawing area being selected, drawn or manipulated is covered by the controlling fingertip, stylus or control tool and is impossible to see, select or accurately relocate, that area being a single point covered by a fingertip, stylus or other common cursor control for touch-screen use.

BACKGROUND

Generally speaking, digital computing devices include input-output display areas for receiving input signals from a user and for outputting data and information to the user. Typically the user provides input to and otherwise interacts with the digital device by locating and manipulating a cursor on a graphical user interface (GUI). Based on the operating system of the digital computing device, the GUI may include windows, icons, menus and the like, and the cursor may be represented visually on the GUI by an arrow, cross hair, line or like symbol. Many digital computing devices manipulate the cursor with a mouse or like peripheral input device such as a light pen or stylus. When operating the mouse, pen or stylus, the cursor position and thus the selection activity (hereinafter cursor activation point) is largely unobscured on the GUI. For many portable digital computing devices, touch-sensitive screens and capacitive touch-sensitive screens are common input-output display areas. Such portable digital devices include, for example, mobile phones, tablets, laptop computers and other electronic devices. On touch-sensitive screens, the user locates and manipulates the cursor by touch or finger contact at a precise location defined by, for example, an array or grid of coordinates mapping the area of the touch-sensitive screen into, for example, row by column coordinates, x-axis and y-axis coordinates or the like, in a two-dimensional space. On conventional touch-sensitive screens, the cursor activation point is located at a precise location of contact on the screen and thus, the cursor or activation point is obscured from the user's view on the touch-sensitive screen by the user's finger or other touch-input device, for example, a pen or stylus having a capacitive tip for use with touch-enabled displays. As should be appreciated, while smaller than the user's finger, many touch-input devices have a diameter at point of contact that is large enough to at least partially obscure the precise location of contact with the touch-sensitive display. When the cursor location and thus cursor activation point is obscured, drawing, selecting a precise point on which to join lines, or activating a location-critical function, process or procedure is made more difficult, if not substantially impossible, to complete with accuracy.

Based on the foregoing, it is the general object of this invention to provide a non-obscuring graphic user interface defined cursor displacement tool that allows a point, object being selected, or line being drawn to be fully visible while active fingertip motion and location manipulation about the screen is occurring. One object of the present invention is to provide a GUI defined cursor displacement tool whereby the cursor activation point is offset from the precise location of contact or touch point on the touch-sensitive screen providing, in effect, operation as a remotely extended fingertip control. In one embodiment, the non-obscuring graphic user interface defined cursor displacement tool is represented as a remotely extended fingertip control that, in direct relation based on offsets to coordinates, moves the cursor activation point by a predetermined or user-defined offset from the precise location of fingertip contact or the touch point on the touch-sensitive screen. In one embodiment, the GUI defined cursor displacement tool can be parked and selectively activated and available on the screen so that when contacted and dragged, it moves with that contact location. When that contact is ended, the cursor displacement tool either returns to its dock (home-position) or stays in place as predetermined or user-defined in, for example, system settings. In one embodiment, the offset distance and spatial relation from the contact location to the cursor activation point is controllable so as to be set according to preference. Another object of the present invention is to provide a menu of preset, predetermined cursor displacement distances or offsets. Another object of the present invention is to provide a GUI defined cursor displacement tool that responds to other input such as a tap by another finger or a keystroke to allow a point, line or object to be grabbed, moved, released, copied or deleted as desired or any other gesture that the tool has been programmed to recognize. Another object of the present invention is to provide a status indicator that indicates visually or otherwise the status of the tool. Such a status indicator can be a visible indicator, such as a changing shade or color, a graphic object such as a check or text letter, or any visible indicator showing that the cursor displacement tool is in use. The status of the tool can also be conveyed to the user via device vibration amongst other ways. The status indicator can be located and move with the GUI defined cursor displacement tool or can be located elsewhere on the screen.

SUMMARY OF THE INVENTION

In one aspect, the present invention is directed to a graphical user interface ("GUI") defined cursor displacement tool for use on a touch-sensitive display or screen of a computing system, the GUI defined cursor displacement tool comprising: a first portion defining a cursor control handle; a second portion defining a cursor tip; and an offset visibly separating the cursor control handle and the cursor tip; wherein the control handle is operable to synchronously move about the touch-sensitive screen with the cursor tip, at the offset from the cursor tip, to interact with screen graphics displayed on the touch-sensitive screen.

In one aspect, the present invention is directed to a program for providing a defined cursor displacement for use with a computer system having a touch-sensitive screen, the program stored on a non-transitory computer readable medium that causes a processor to execute: a) displaying a cursor activation point configured to activate at least one software application and perform cursor tasks configured by the at least one software application; b) displaying a motion-enabled touch-sensitive cursor control handle fixedly remote to the cursor activation point; c) defining an offset visibly separating the cursor control handle and the cursor activation point; and d) synchronously operate the cursor control handle to move about the touch-screen with the fixedly remote cursor activation point, at the offset from the cursor activation point, to interact with screen graphics displayed on the capacitive touch-screen.

BRIEF DESCRIPTION OF THE DRAWINGS

FIG. 4 is a simplified schematic block diagram of another exemplary computing system having a graphical user interface employing a cursor displacement tool in accordance with one embodiment of the present invention.

DETAILED DESCRIPTION OF PREFERRED EMBODIMENTS

Figure 1:
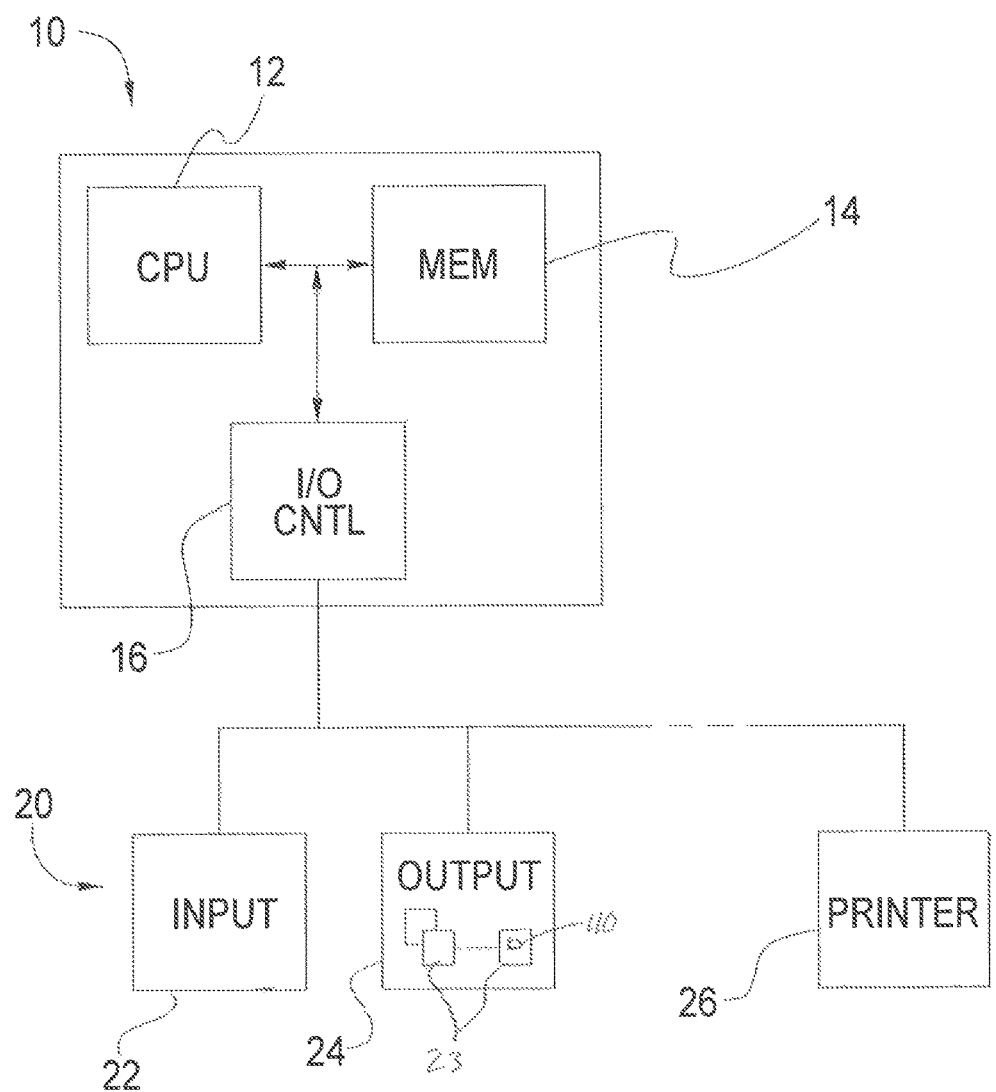
FIG. 1 is a simplified schematic block diagram of an exemplary computing system having a graphical user interface employing a cursor displacement tool in accordance with one embodiment of the present invention.

Typically, when the user selects a software application program drawing tool, an item from a library, or a prescribed geometric shape option from a program menu of options, the user has the capability to use the selected tools and objects within the software application program. Such tools and objects are displayed on a graphical user interface ("GUI") and are operated by the user with a remote mouse, stylus pen or one or more fingertips. Following established gesture guidelines, the user directly interacts or interfaces with the program and its functionality by use of a cursor. Typically, the movements of the cursor are tracked and represented visually on the GUI that is exhibited on a display device or screen. The cursor is itself a point of interaction visualization on the GUI at which the user engages the cursor. As noted herein, the cursor position or point of interaction on the GUI that is exhibited on the display device or screen is referred to as the cursor activation point. In the case of a touch-sensitive display device or screen, the cursor activation point may be obscured, partially or fully, by the user's fingertip or portion of a light pen or stylus. As disclosed herein, the present invention provides a novel system and method for use of a non-obscured cursor displacement tool on a touch-sensitive screen referred to herein as a GUI Defined Cursor Displacement Tool. In embodiments, the GUI Defined Cursor Displacement Tool may be employed on a tablet computer, laptop computer, free standing computer monitor, mobile phone, personal digital assistant or other electronic device, and preferably, portable electronic devices, that use a touch-sensitive display as a user interface. The GUI Defined Cursor Displacement Tool of the present invention provides an offset to the cursor activation point that allows a user to draw or select a point on the touch-sensitive screen that is offset from a precise location of contact or touch point on the touch-sensitive screen so that the user can see, without visual impairment, where the cursor is active when the user is drawing and/or selecting on object on the screen. When the GUI Defined Cursor Displacement Tool is not enabled, it can be docked at a designated area, and remains selectively available for use.

In one embodiment, the GUI Defined Cursor Displacement Tool may be represented on the GUI in two portions including, for example, a first circle, fingertip pad or cursor control handle portion and a second cursor tip portion that is at a predetermined or user-definable location, remote from the cursor control handle portion. The remote second cursor tip portion can be visually represented as an arrow, crosshairs or other representation of the cursor activation point where a user can operate the Cursor Displacement Tool to create a dot, start a line, grab an object, snap-to a location or perform any other action or gesture that a finger or stylus can perform on a touch-screen. It should be appreciated that the Cursor Displacement Tool enables all conventional fingertip drawing operations to behave as they would otherwise operate until the user touches a control designator or icon to enable the GUI Defined Cursor Displacement Tool and thereby its offset functionality as described herein. The user can drag the GUI Defined Cursor Displacement Tool icon around the screen, using other taps and gestures to create a dot, start and draw a line, grab an object, snap-to a location or perform any other cursor action. Releasing the drag gesture can cause the GUI Defined Cursor Displacement Tool icon to return to its dock or stay in its current location per user preference. The GUI Defined Cursor Displacement Tool icon can operate in view coordinates prior to conversion to document coordinates.

Users can interact or otherwise interface with the touch-screen to provide input, as the GUI Defined Cursor Displacement Tool merely provides an offset of the cursor activation point from the precise location of contact or touch point on the touch-sensitive screen. This allows the user to draw in a position offset from their touch location so the drawing activity can be clearly seen. Such interaction includes but is not limited to the following: drawing, using the selected drawing tool (line, curve, circle, etc.); selecting/deselecting objects; editing the position or shape of selected objects; highlighting text; and moving control handles that manipulate parameters of selected drawing objects. Preferably, the GUI Defined Cursor Displacement Tool has a visual representation that indicates, in two portions, where the user's touch should be placed on the display screen (i.e., the cursor control handle portion) as well as where the cursor activation point is enabled (i.e., the second cursor tip portion). When the user releases their initial gesture, the GUI Defined Cursor Displacement Tool stays where it is or, per user preference, automatically docks in its home position and the current drawing gesture ends.

As shown in FIG. 1, a computer system 10 is configured and selectively operates in accordance with one embodiment of the present invention providing the GUI Defined Cursor Displacement Tool. The computer system 10 is, for example, a tablet computer, laptop computer, free standing computer monitor, mobile phone, personal digital assistant or other device that uses a touch sensitive display or touch-sensitive screen as a user interface. As shown in FIG. 1, the system 10 includes a processor such as a microprocessor or CPU 12, a non-transitory computer-readable medium or memory 14, an input-output controller 16 operatively coupled to input and output devices, respectively shown generally at 20, including an input device 22 for facilitating input of data and information to the system 10 such as a keyboard, a mouse, a light pen pointing device, document scanner, or other input device, and output devices for displaying inputted and/or processed data and other information such as a pixel-oriented display device 24, printer 26 or the like. In one embodiment, the input device 22 and the output device 24 are embodied as a unitary device, for example, a touch-sensitive screen that exhibits one or more GUI 23 incorporating a GUI Defined Cursor Displacement Tool 110 as defined herein for receiving input signals from a user and for outputting data and information to the user.

The processor 12 executes computer-implemented steps for running a software application program for operating the GUI Defined Cursor Displacement Tool 110 with the GUIs 23. It should be appreciated that the operation of the non-obscuring GUI Defined Cursor Displacement Tool 110 generally requires manipulation of data in the form of electrical, magnetic and/or optical signals that may be inputted, stored, transferred, combined, compared, or otherwise manipulated to provide a desired result. In one embodiment, a desired result includes visual representations of one or more data and information based upon operation of the GUI Defined Cursor Displacement Tool 110.

Figure 2A:
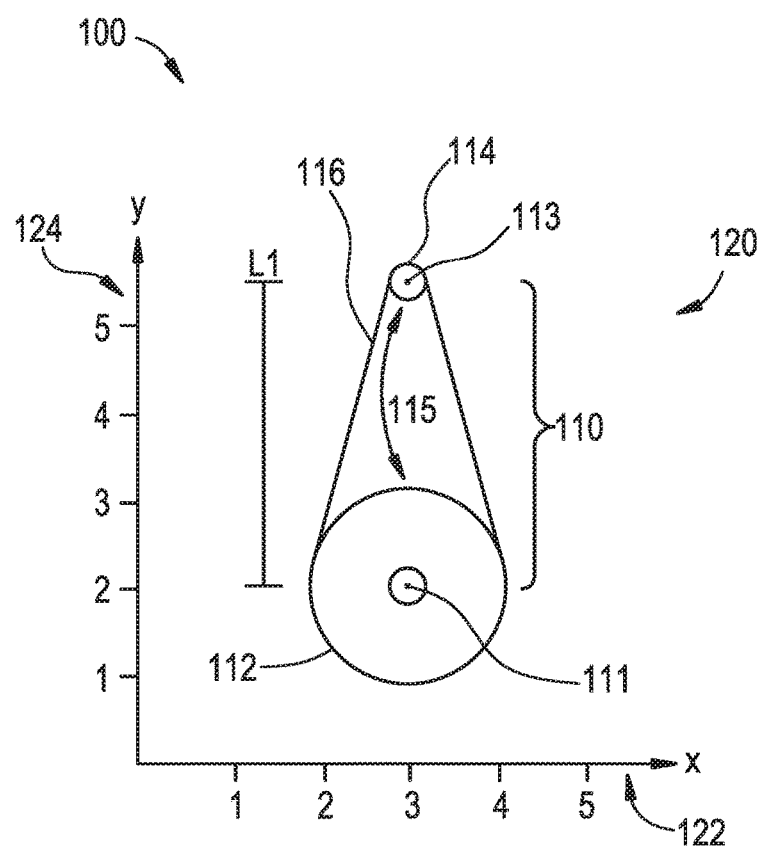
FIG. 2A is a rendering of a cursor displacement tool in accordance with one embodiment of the present invention.

A rendering 100 of one embodiment of a GUI Defined Cursor Displacement Tool 110 on a GUI 23 exhibited a touch-sensitive display or screen 120 is illustrated in FIG. 2A. FIG. 2A includes a grid defined by respective X-axis and Y-axis location tracking coordinates 122 and 124. The coordinates 122 and 124 are not usually visible on touch-screens and are shown in FIG. 2A to illustrate a user-adjustable fixed-distance relationship or offset, as defined herein, between the first cursor control handle portion and the second cursor tip portion. As illustrated in FIG. 2A the GUI Defined Cursor Displacement Tool 110, also referred to herein as the "tool 110", includes a motion-enabled, touch-sensitive graphic fingertip cursor control handle portion 112 exhibited on the touch-sensitive screen 120. The cursor control handle portion 112 depicts the contact area of the user's fingertip on the touch-sensitive screen 120 and thus responses to and is activated by movement about the touch-sensitive screen 120. The GUI Defined Cursor Displacement Tool 110 also includes a cursor tip portion 114 exhibited on the touch-sensitive screen 120. The cursor activation point of conventional input devices such as an input device 22 is embodied by the cursor tip portion 114, which is configured to define the coordinates 122 and 124 of the cursor activation point on the touch-sensitive screen 120. Thus, in relation to conventional operation, the cursor tip portion 114 interacts with screen graphics exhibited on the output display device 24 to select an object (e.g., an icon, widget, etc.), choose a location, begin or end a line and perform other cursor tasks configured by software selected by the user, for example, software residing in memory 14. It should be appreciated that any electronic input device having a capacitive tip can be utilized as the cursor tip portion 114 to interact with screen graphics.

Figure 2B:
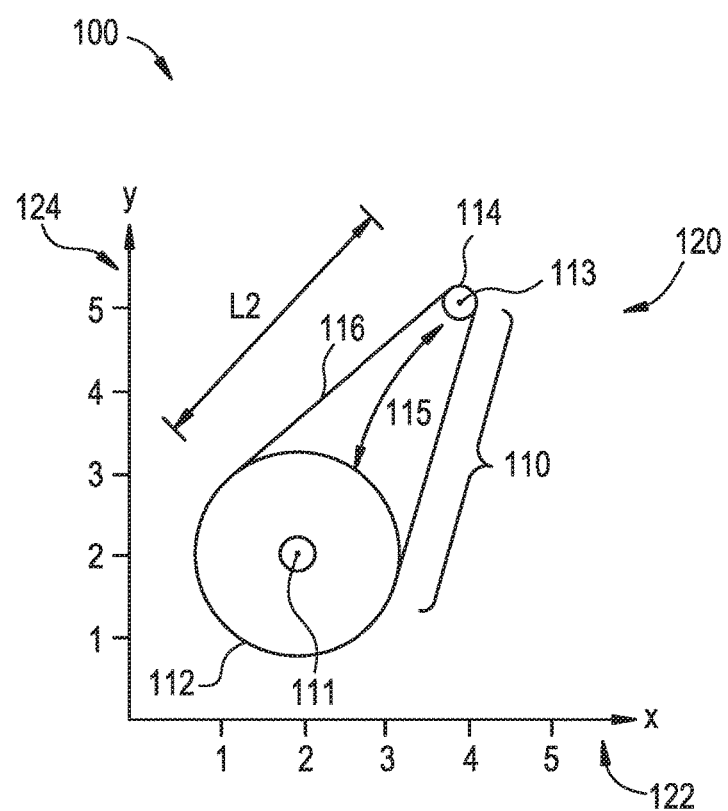
FIG. 2B is a rendering of a cursor displacement tool in accordance with one embodiment of the present invention.

As illustrated in FIG. 2A, the cursor control handle portion 112 is fixedly remote from the cursor tip portion 114 at a cursor offset distance L1 (e.g., as measured between center points of each graphic element, 111 and 113 respectively) such that the cursor tip portion 114 is visible when a user's fingertip is touching the touch-sensitive screen 120 and overlaying the cursor control handle portion 112. As a result, an offset 115 is defined thereby visibly separating the cursor control handle portion 112 and the cursor tip portion 114. In one embodiment, the cursor offset distance L1 is selectively configured by a user. In one embodiment, the cursor offset distance L1 is a user-defined parameter of the location of the cursor tip portion 114 in relation to the cursor control handle portion 112. In one embodiment, the cursor offset distance L1 is selectively configured to be a set combination of location tracking coordinates 122 and 124 at any given moment. Thus, the cursor control handle portion 112 is operable to synchronously move about the touch-sensitive screen 120 with the cursor tip portion 114, at the offset 115 from the cursor tip portion 114, to interact with screen graphics displayed on the display device 24 to select an object, choose a location, begin or end a line and perform other cursor tasks configured by software selected by the user, for example software residing in memory 14. The cursor control handle portion 112 is exhibited on the touch-sensitive screen 120 as a graphic image such as for example, a circle, fingertip, target or other shape indicating where the cursor control handle portion 112 may be operated by a finger, stylus or other interfacing object. While the cursor tip portion 114 is shown and described as fixedly remote to the cursor control handle portion 112 at a one-dimensional cursor offset distance L1 (e.g., along the Y-axis), the present invention is not limited in this regard as the cursor tip portion 114 may be fixedly remote to the cursor control handle portion 112 in more than one dimension, such as for example at a two-dimensional cursor offset distance L2 (e.g., along the X-axis and the Y-axis) as shown in FIG. 2B, without departing from the broader aspects of the present invention.

In one embodiment, a cursor state indicator 116 provides a visible indicator on the touch-sensitive screen 120 showing that the tool 110, or the cursor control handle portion 112, is activated and in use or not activated. The cursor state indicator 116 is positioned and moves with the cursor control handle portion 112 or optionally can be located elsewhere on the touch-sensitive screen 120. In one embodiment, the cursor state indicator 116 emanates from the cursor control handle portion 112 to the cursor tip portion 114 thereby providing the visible indicator on the touch-screen 120 of the displacement or cursor offset distance L1 of the cursor activation point from the cursor control handle portion 112 to the cursor tip portion 114.

Figure 3:
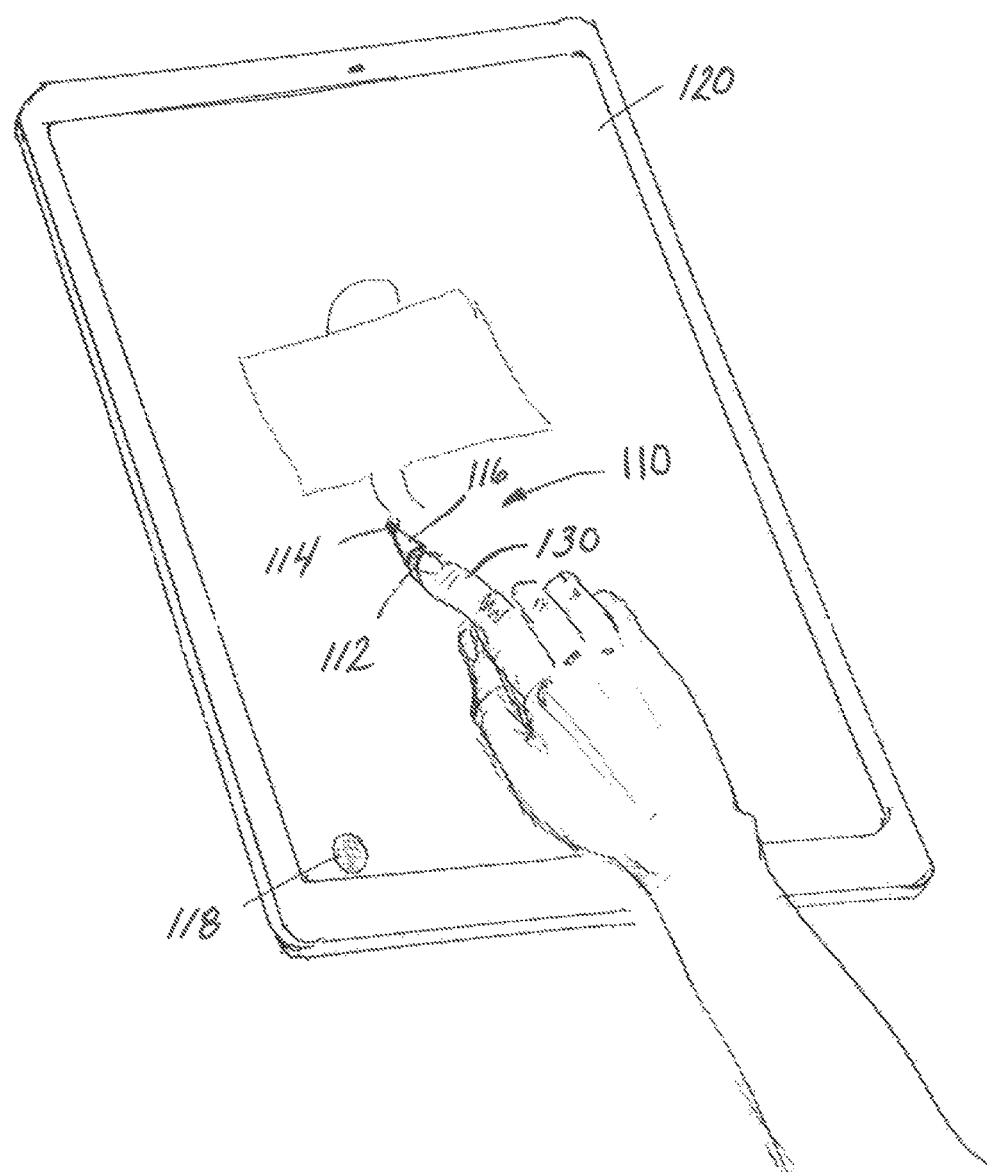
FIG. 3 is a perspective view of the cursor displacement tool of FIG. 2 in use with a touch-sensitive display screen.

A method of use of the GUI Defined Cursor Displacement Tool 110 on the touch-sensitive screen 120 is illustrated FIG. 3. When a user touches, taps or taps and drags the cursor control handle portion 112 using a contact finger 130, the cursor control handle portion 112 and the cursor tip portion 114 move together in unison on the touch-screen 120 effecting the offset of the cursor activation point. In one embodiment, a docking location 118 is selectively configured and located on the touch-sensitive screen 120 according to user preference. The docking location 118 is a fixed position on the touch-sensitive screen at which a user can grab, move, return, park and retrieve the cursor control handle portion 112 and the fixedly remote cursor tip portion 114. In one embodiment, the docking location is selectively positioned in a margin, corner or other peripheral portion of the touch-screen 120. In one embodiment, the tool 110 automatically returns to the docking location 118 when released by lifting the contact finger 130. A first selectable setting enables the user to cause the cursor control handle portion 112 to automatically return to the docking location 118 upon release of the cursor control handle portion 112. In one embodiment, the tool 110 is selectively configured to remain in a last-place-of-use when the contact finger 130 is lifted. A second selectable setting enables the user to cause the cursor control handle portion 112 to remain in a contemporaneous location on the touch-sensitive screen 120 upon release of the cursor control handle portion 112.

In one embodiment, a user engages the GUI Defined Cursor Displacement Tool 110 by activating or selecting it by performing an activation gesture, such as for example, the user touches, taps or taps and drags the cursor control handle portion 112 using the contact finger 130. The user moves the tool 110 about the touch-sensitive screen 120 by maintaining contact with the tool 110 and dragging it. The user moves the tool 110 so that the cursor tip portion 114 is over an object that can be selected. In one embodiment after activating the tool 110, the user performs a first gesture with the cursor control handle portion 112 to select the object, such as for example applying the contact finger 130 to the cursor control handle portion 112, and a second gesture with the cursor control handle portion 112 to activate the cursor tip portion 114 to perform selectable software application functions and display screen activities, such as for example moving the selected object about the touch-screen 120 by maintaining the select-and-hold gesture and moving the cursor control handle portion 112. The user releases the cursor control handle portion 112 to end interactions with the tool 110 and return the tool 110 to the docking location 118 and deselect the object to leave it where it was last held on the touch-sensitive screen 120. Such activation first and second gestures are selectively customizable and include, for example: a single tap and hold gesture; a double tap gesture; a double tap and hold gesture; use of one or more than one finger; other single or multiple activators; and any combination thereof. Moreover, such activation illustrates the aforementioned offset by the tool 110 of the cursor activation point.

In one embodiment, a user engages the tool 110 by selecting it. The user moves the tool 110 about the touch-screen 120 by maintaining contact with the tool 110 and dragging it. The user places the cursor tip portion 114 over an area where they wish to draw or manipulate the document. The user can employ multiple simultaneous gestures to move the cursor control handle portion 112 on the touch-sensitive screen 120 and draw on the document. The user releases the cursor control handle portion 112 to end interactions with the tool 110, to return the tool 110 to the docking location 118, or to end or interrupt displaced drawing operation.

The processor 12 executes optional computer-implemented steps for running the software application program for operating the GUI Defined Cursor Displacement Tool 110 with the touch-sensitive screen 120 as described hereinabove. In one embodiment, a custom gesture recognizer is provided and includes a parameter to determine an optimal direction and distance of the cursor offset distance L1, L2 described above. In one embodiment, a cursor displacement control is provided that traps, touches and provides the graphical image of the cursor state indicator 116.

In one embodiment, the GUI Defined Cursor Displacement Tool 110 is in an inactive state. In one embodiment, all states for the tool 110 are visually or otherwise represented by a graphical image on the touch-sensitive screen 120 such as for example the cursor state indicator 116. When the tool 110 is in an inactive state, the user interacts with the software without displaced touch control by directly engaging the appropriate input device 22. In one embodiment, custom gestures are configured for operating the tool 110. In one embodiment, the tool 110 is enabled to respond to multiple gestures that occur simultaneously. For example, when editing a drawing with the tool 110, users can use rotate, pan, and pinch gestures in combination to achieve various gesture-based effects. In one embodiment, when the tool 110 is activated, the state of the tool 110 changes according to the location of the cursor tip portion 114. For example, if the cursor tip portion 114 is over a selectable object, the state of the tool 110 may change to "Select". In one embodiment, certain gestures recorded during use of the tool 110 toggle different states of the tool 110. For example, while a user has one finger on the cursor control handle portion 112, the user can employ a two-finger tap gesture to toggle between a "Select" and a "Draw" state. In one embodiment, programmatic logic is employed to prevent taps intended to toggle-on offset drawing from having other side effects such as selecting objects.

In one embodiment, the distance and spatial relationship between the cursor tip portion 114 and the cursor control handle portion 112 is selectively configured and set as one or more user preferences. In one embodiment, this relationship is programmatically defined in the source code of an application employing the tool 110. In one embodiment, the offset distance L1, L2 is set to match the location of an initial touch on the touch-sensitive screen 120 by the user (i.e., the selection or activation of the tool 110 by the user) such that the location of the initial touch and the location of the cursor control handle portion 112 are at the same coordinates.

In one embodiment and as shown in FIG. 4, the computer system 10 of FIG. 1, incorporating the use of the GUI Defined Cursor Displacement Tool 110 with the GUIs 23, includes a transceiver 18 operatively coupled to a communications network 40 such as the Internet, an intranet, an extranet, or like distributed communication platform for accessing one or more storage devices 50 and/or sending and receiving data, information, commands, and otherwise communicating with one or more external devices 60 over wired and wireless communication connections.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A graphical user interface ("GUI") defined cursor displacement tool for use on a touch-sensitive display or screen of a computing system, the GUI defined cursor displacement tool comprising:
    a first portion defining a cursor control handle;
    a second portion defining a cursor tip;
    an offset visibly separating the cursor control handle and the cursor tip;
    a docking location on the touch-sensitive screen at which a user can grab, move, return, park and retrieve the cursor control handle and the fixedly remote cursor tip;
    a first selectable setting wherein the cursor control handle can be caused to automatically return to the docking location upon release of the cursor control handle; and
    a second selectable setting wherein the cursor control handle can be caused to remain in a contemporaneous location on the touch-sensitive screen upon release of the cursor control handle;
    wherein the control handle is operable to synchronously move about the touch-sensitive screen with the cursor tip, at the offset from the cursor tip, to interact with screen graphics displayed on the touch-sensitive screen.

2. The GUI defined cursor displacement tool of claim 1 further comprising an offset distance defined between the cursor control handle and the cursor tip, the offset distance being selectively configured by a user.

3. The GUI defined cursor displacement tool of claim 1, the cursor control handle further comprising:
a graphic image displayed on the touch-sensitive screen indicative of the cursor control handle.

4. The GUI defined cursor displacement tool of claim 1 further comprising:
a state indicator providing a visible indicator on the touch-sensitive screen showing that the tool is or is not activated.

5. The GUI defined cursor displacement tool of claim 4, wherein:
the state indicator emanates from the cursor control handle to the cursor tip providing the visible indicator showing that the tool is activated.

6. The GUI defined cursor displacement tool of claim 1 further comprising:
a cursor control handle first gesture recognition that, when performed by a user, select an object displayed on the touch-sensitive screen; and
a cursor control handle second gesture recognition that, when performed by the user, activates the cursor tip thereby performing selectable software application functions with the cursor control handle.

7. A program for providing a defined cursor displacement for use with a computer system having a touch-sensitive screen, the program stored on a non-transitory computer readable medium that causes a processor to execute:
a) displaying a cursor activation point configured to activate at least one software application and perform cursor tasks configured by the at least one software application;
b) displaying a motion-enabled touch-sensitive cursor control handle fixedly remote to the cursor activation point;
c) defining an offset visibly separating the cursor control handle and the cursor activation point;
d) synchronously operate the cursor control handle to move about the touch-screen with the fixedly remote cursor activation point, at the offset from the cursor activation point, to interact with screen graphics displayed on the capacitive touch-screen;
e) displaying a docking location on the touch-sensitive screen at which a user can grab, move, return, park and retrieve the cursor control handle and the fixedly remote cursor activation point;
f) defining a first selectable setting wherein the cursor control handle can be caused to automatically return to the docking location upon release of the cursor control handle; and
g) defining a second selectable setting wherein the cursor control handle can be caused to remain in a contemporaneous location on the touch-sensitive screen upon release of the control handle.

8. The program of claim 7 wherein step (b) comprises:
b) displaying a motion-enabled touch-sensitive control handle fixedly remote to the cursor activation point by displaying a graphic image on the touch-sensitive screen indicating where the cursor control handle may be operated by an interfacing object.

9. The program of claim 7 wherein the program causes the processor to further execute:
h) displaying a visible indicator on the touch-sensitive screen showing that the cursor control handle is or is not activated.

10. The program of claim 9 wherein the program causes the processor to further execute:
i) displaying the visual indicator as emanating from the cursor control handle to the cursor activation point providing the visible indicator showing that the cursor control handle is activated.

11. The program of claim 7 wherein the program causes the processor to further execute:
h) selecting an object displayed on the touch-sensitive screen upon recognition of a cursor control handle first gesture performed by a user; and
i) activating the cursor activation point thereby performing selectable software application functions upon recognition of a cursor control handle second gesture performed by the user.

* * * * *